United States Patent
Bostick et al.

(10) Patent No.: US 9,922,563 B2
(45) Date of Patent: Mar. 20, 2018

(54) DYNAMIC CROSS-LANE TRAVEL PATH DETERMINATION BY SELF-DRIVING VEHICLES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 15/162,839

(22) Filed: May 24, 2016

(65) Prior Publication Data

US 2017/0345309 A1    Nov. 30, 2017

(51) Int. Cl.
*G08G 1/16* (2006.01)
*G05D 1/00* (2006.01)
(Continued)

(52) U.S. Cl.
CPC ............. *G08G 1/166* (2013.01); *B60K 35/00* (2013.01); *B60W 30/16* (2013.01);
(Continued)

(58) Field of Classification Search
None
See application file for complete search history.

(56) References Cited

U.S. PATENT DOCUMENTS 5,213,250 A    5/1993    Simon
6,059,378 A    5/2000    Dougherty et al.
(Continued)

FOREIGN PATENT DOCUMENTS

CN    102708681 A    10/2012
CN    203063940 U    7/2013
(Continued)

OTHER PUBLICATIONS

Toy et al., "Emergency Vehicle Maneuvers and Control Laws for Automated Highway Systems", IEEE Transactions on Intelligent Transportation Systems, vol. 3, No. 2, Jun. 2002.*
(Continued)

*Primary Examiner* — Redhwan K Mawari
*Assistant Examiner* — Edward Torchinsky
(74) *Attorney, Agent, or Firm* — John R. Pivnichny; Law Office of Jim Boice

(57) ABSTRACT

A method, system, and/or computer program product creates an unimpeded pathway on a roadway for a first self-driving vehicle (SDV). One or more processor(s) determine a first vehicle priority level of the first SDV. The processor(s) determine other vehicle priority levels for other SDVs that are traveling on different lanes on a roadway, and then determine that the first vehicle priority level is higher than any of the other vehicle priority levels. Based on this determination, the processor(s) direct SDV on-board computers on the other SDVs to adjust spacing distances between the other SDVs, such that adjusted spacing distances between the other SDVs provide a pathway on the roadway for the first SDV that includes unobstructed lane changes, thus permitting the first SDV to maneuver around the other SDVs on the roadway in an unimpeded manner.

14 Claims, 8 Drawing Sheets

(51) Int. Cl.
  *B60W 30/16* (2012.01)
  *B60K 35/00* (2006.01)
  *G05D 1/02* (2006.01)
  *G08G 1/01* (2006.01)
  *G08G 1/00* (2006.01)

(52) U.S. Cl.
  CPC ......... *G05D 1/0088* (2013.01); *G05D 1/0287* (2013.01); *G05D 1/0289* (2013.01); *G08G 1/0116* (2013.01); *G08G 1/0145* (2013.01); *G08G 1/22* (2013.01); *G05D 2201/02* (2013.01); *G05D 2201/0213* (2013.01)

(56) References Cited

U.S. PATENT DOCUMENTS

| | | | |
|---|---|---|---|
| 6,083,108 | A | 7/2000 | Grubish |
| 6,572,199 | B1 | 6/2003 | Creek et al. |
| 8,874,360 | B2 | 10/2014 | Klinger et al. |
| 9,278,689 | B1* | 3/2016 | Delp ............ B60W 30/00 |
| 9,665,102 | B2* | 5/2017 | Switkes ............ G05D 1/0293 |
| 2002/0198075 | A1 | 12/2002 | Prucher |
| 2010/0244546 | A1 | 9/2010 | Raymond et al. |
| 2014/0012455 | A1 | 1/2014 | Neff |
| 2014/0278029 | A1 | 9/2014 | Tonguz et al. |
| 2015/0166062 | A1* | 6/2015 | Johnson ............ B60W 30/12 701/41 |
| 2015/0241880 | A1 | 8/2015 | Kim et al. |
| 2015/0286219 | A1 | 10/2015 | Reichel et al. |
| 2015/0353085 | A1 | 12/2015 | Lee |
| 2016/0288788 | A1* | 10/2016 | Nagasaka ............ B62D 15/025 |
| 2017/0050638 | A1* | 2/2017 | Gordon ............ B60W 30/16 |

FOREIGN PATENT DOCUMENTS

| | | |
|---|---|---|
| CN | 103335853 A | 10/2013 |
| JP | 2006113687 A | 4/2006 |
| JP | 2007226835 | 9/2007 |
| WO | 2005097520 A1 | 10/2005 |
| WO | 2013116892 A1 | 8/2013 |

OTHER PUBLICATIONS

P. Mell et al., "The NIST Definition of Cloud Computing", National Institute of Standards and Technology, Information Technology Laboratory, Sep. 2011, pp. 1-7.

S. Narayan et al., "A Priority Based Exploration Algorithm for Path Planning of an Unmanned Ground Vehicle", International Conference on Embedded Systems, 2014, pp. 275-280, IEEE.

K. Zhang et al., "State-Driven Priority Scheduling Mechanisms for Driverless Vehicles Approaching Intersections", IEEE Transactions on Intelligent Transportation Systems, vol. 16, No. 5, Oct. 2015, pp. 2487-2500, IEEE.

O. Ahmad et al., "A Controller for Merging Traffic Onto a Highway", Image 2003 Conference, pp. 1-5, The Image Society.

\* cited by examiner

DYNAMIC CROSS-LANE TRAVEL PATH DETERMINATION BY SELF-DRIVING VEHICLES

BACKGROUND

The present disclosure relates to the field of vehicles, and specifically to the field of self-driving vehicles. Still more specifically, the present disclosure relates to the field of automatically providing a pathway around other self-driving vehicles on a roadway.

Self-driving vehicles (SDVs) are vehicles that are able to autonomously drive themselves through private and/or public spaces. Using a system of sensors that detect the location and/or surroundings of the SDV, logic within or associated with the SDV controls the propulsion, stopping, and steering of the SDV based on the sensor-detected location and surroundings of the SDV.

As SDVs overtake public roadways, managing their movement becomes significant in order to take advantage of the superior maneuvering abilities of the SDVs. However, most prior art solutions to this problem involve some SDVs simply acquiescing to other SDVs, regardless of which SDV technically has the right of way. However, this causes further problems since such movements cause traffic backups, congestion, and other interruptions to normal and/or engineered traffic flows.

For example, in Tonguz et al. (U.S. Patent Application Publication No. 2014/0278029), dynamic traffic control (DTC) systems include mechanisms that allow certain vehicles to have higher priority than other vehicles in having the right of way at intersections. However, this simply causes cross-traffic patterns to be stalled, thus negating the advantage of having SDV systems whose movement can be coordinated.

Thus, the present invention provides a system that allows SDVs to travel along roadways in a manner that does not negatively impact the traffic flow of other SDVs.

SUMMARY

A method, system, and/or computer program product creates an unimpeded pathway on a roadway for a first self-driving vehicle (SDV). One or more processor(s) determine a first vehicle priority level of the first SDV. The processor(s) determine other vehicle priority levels for other SDVs that are traveling on different lanes on a roadway, and then determine that the first vehicle priority level is higher than any of the other vehicle priority levels. Based on this determination, the processor(s) direct SDV on-board computers on the other SDVs to adjust spacing distances between the other SDVs, such that adjusted spacing distances between the other SDVs provide a pathway on the roadway for the first SDV that includes unobstructed lane changes, thus permitting the first SDV to maneuver around the other SDVs on the roadway in an unimpeded manner.

Thus, these embodiments allow an SDV to travel unimpeded on a roadway, without unduly disrupting the traffic flow of other SDVs on the roadway.

In an embodiment of the present invention, the SDV on-board computers on the other SDVs are directed to adjust spacing distances between the other SDVs by altering velocities of the other SDVs without changing lanes. This provides an additional advantage of reducing the potential of either blocking a lane or having a collision by the SDVs.

In an embodiment of the present invention, the vehicle priority level of the first SDV is determined according to a purpose of traveling to the current planned destination by the first SDV. For example, if the first SDV is going to a hospital, then it is given higher priority than if it were traveling to a bowling alley. This provides the additional advantage of fairly assigning priority levels, such that the system is able to be implemented in an efficient manner without being overloaded by SDVs having improperly-assigned high priority levels.

DETAILED DESCRIPTION

Figure 1:
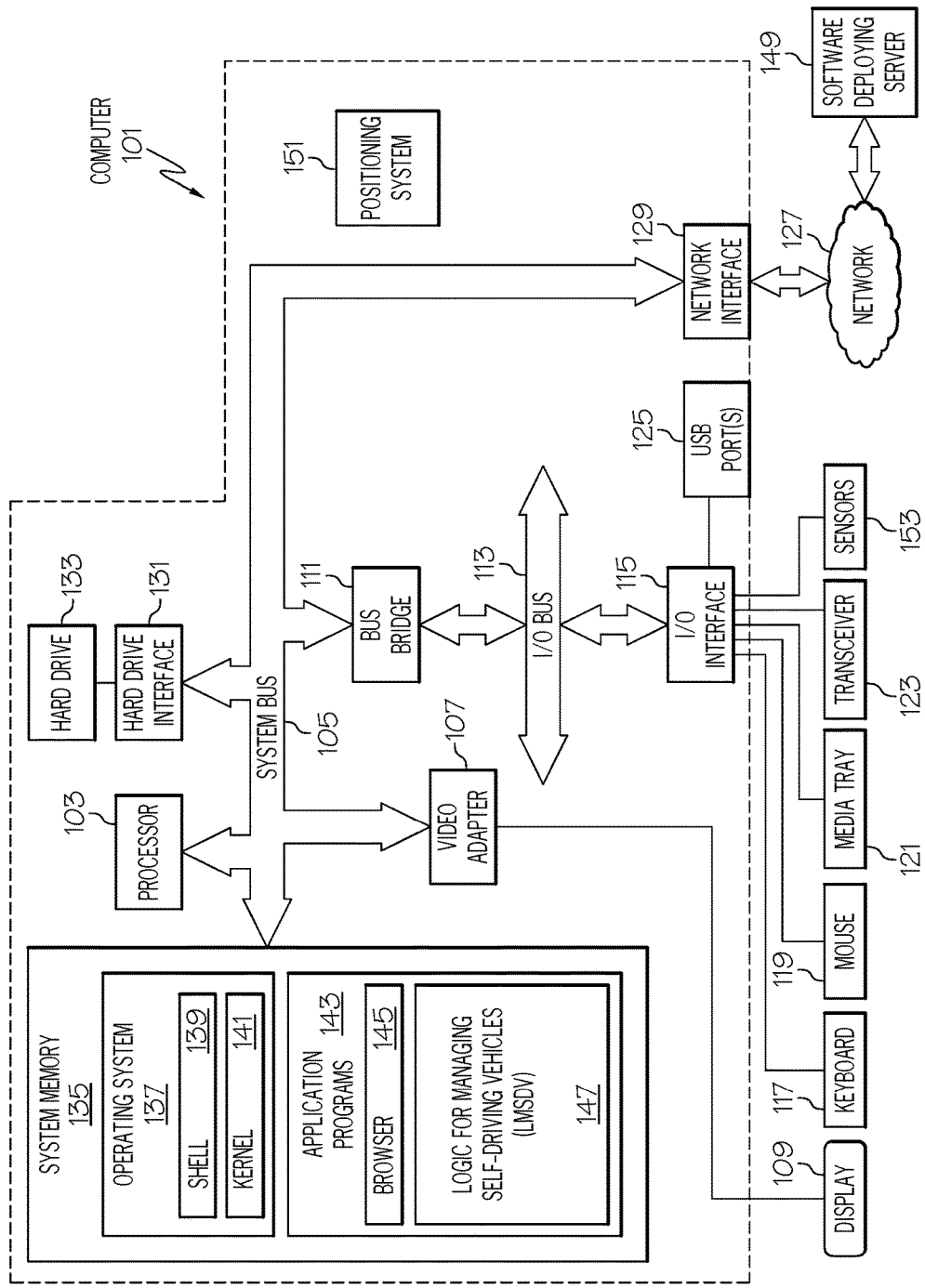
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention allows autonomous cars the capability to understand more than just the relative positioning and speed of surrounding self-driving vehicles (SDVs). Rather, the present invention also allows for the communication of where each SDV on a roadway is going and for what purpose, and then ranks the importance of SDVs accordingly. Based on these SDV priorities, the traffic is adjusted in such a way as to allow the SDVs of higher importance more open passage-ways through the roadway. This extends the capability to communicate and understand the position and speed of surrounding SDVs in such a way as to manipulate the speed of other SDVs and not just a first SDV (which has a higher priority). This ensures faster and more open passages to those SDVs having the highest levels of importance.

The present invention considers multiple levels of priority that can be used to determine which SDV is to be given an unobstructed pathway on the roadway, on which multiple SDVs are traveling in the same direction. Based on these multiple levels of priority, traffic patterns are adjusted in such a way as to allow the SDVs of higher importance more open passageways through the highway system (roadway).

The present invention adds an intelligence level that takes into account where each SDV is going and for what purpose. These factors are used to adjust the priority levels. For example, an SDV traveling to a hospital has a higher priority than an SDV traveling to a bowling alley. Thus, SDVs traveling to the bowling alley yield the right of way to SDVs that are going to the hospital.

A controlling system communicates and manipulates the speed for other vehicles as necessary to create the optimal spacing for allowing the higher-priority SDV to weave in and out of the other SDVs on the roadway. In one or more embodiments, some of the other SDVs are sped up while other SDVs are slowed down, thus providing this optimal spacing.

Thus, if an adjustment needs to be made in order to clear room for an ambulance (emergency priority 1), and two other SDVs are traveling next to each other, the system will instruct the next highest priority SDVs (e.g., SDVs going to courthouse having a priority 2) to speed up and pass a lowest priority SDV (e.g., an SDV that is going to a bowling alley and thus has a lowest priority 4), followed by a lane change by the priority 2 SDVs so that a lane is cleared for the ambulance (emergency priority 1).

In one or more embodiments of the present invention, based on destination and other factors (vehicle type, vehicle size, vehicle priority type), SDVs are prioritized, such that certain SDVs are allowed to travel faster. Thus, computer intelligence figures out the importance level of surrounding vehicles and uses that information to adjust traffic patterns in such a way as to allow the vehicles of higher importance more open passage-ways through the highway system.

The present invention utilizes either controller to vehicle communications or vehicle to vehicle communications (forming an ad hoc Internet of things), such that certain SDVs are controlled in order to allow a highest priority SDV a clear pathway on a roadway.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or coordinating server 201 depicted in FIG. 2, and/or self-driving vehicle (SDV) on-board computer 401 shown in FIG. 4, and/or coordinating server 501 depicted in FIG. 5.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
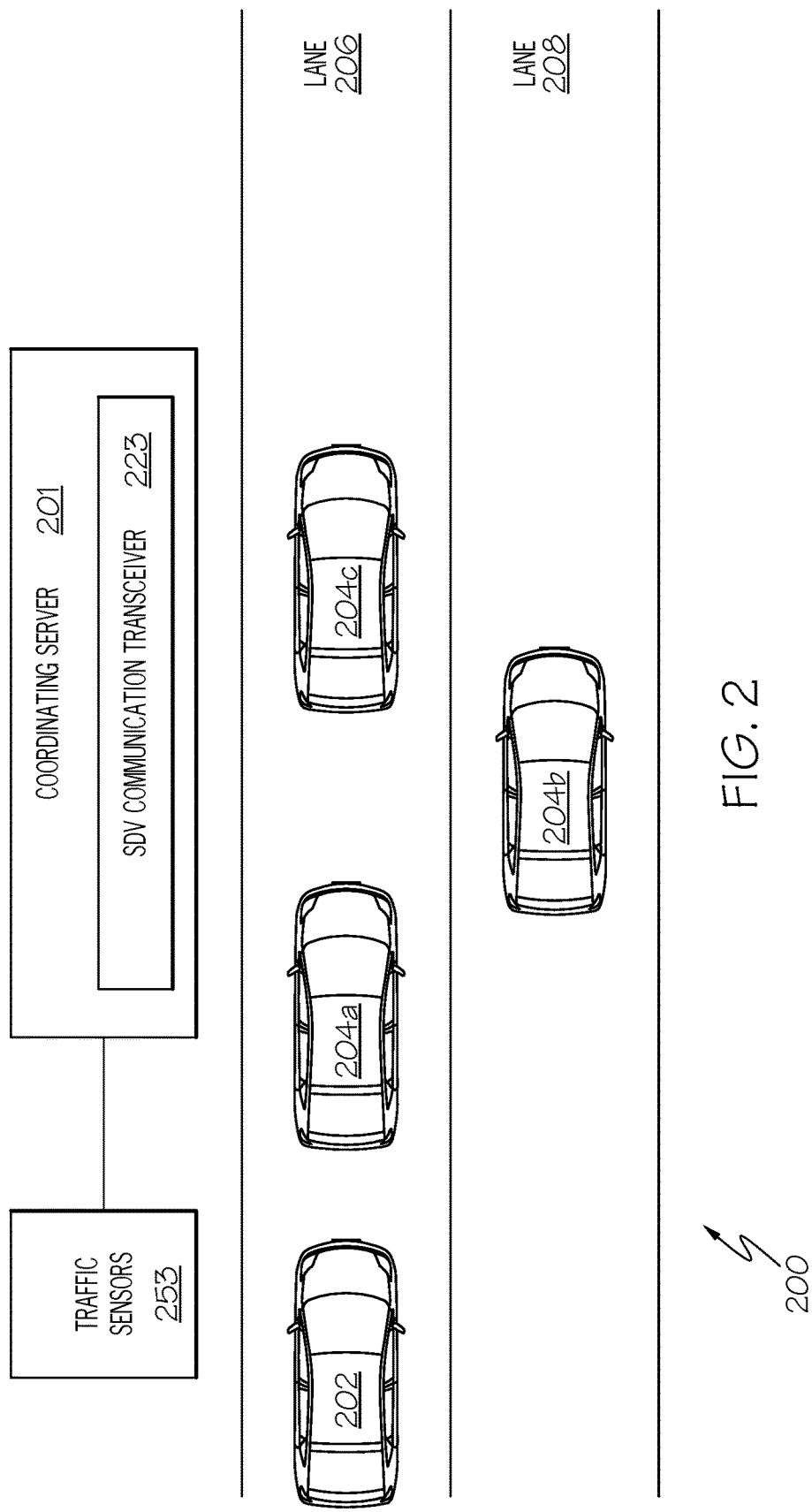
FIG. 2 illustrates exemplary self-driving vehicles (SDVs) operating on a roadway in a congested manner.

As depicted, computer 101 is able to communicate with a software deploying server 149 and/or other devices/systems (e.g., coordinating server 201, the SDV 202 and/or SDVs 204a-204c shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-6. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two or three dimensional locations.

Also associated with computer 101 are sensors 153, which detect an environment of the computer 101. More specifically, sensors 153 are able to detect other vehicles, road obstructions, pedestrians, construction sites, etc. For example, if computer 101 is on board a self-driving vehicle (SDV), then sensors 153 may be cameras, radar transceivers, microphones, etc. that allow the SDV to detect the environment (e.g., other vehicles, road obstructions, pedestrians, etc.) of that SDV. Similarly, if hardware within computer 101 is used by coordinating server 201 shown in FIG. 2, then sensors 153 may be cameras, radar transceivers, radio frequency identifier (RFID) transceivers, etc. that allow the coordinating server 201 to identify oncoming and/or passing-by vehicles, including SDVs.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

With reference now to FIG. 2, exemplary self-driving vehicles (SDVs) are depicted operating on a roadway 200 in a congested manner. For example, assume that SDV 202 is an SDV that has a highest priority rating (e.g., is an ambulance going on an emergency run to a hospital). Assume further that SDVs 204a-204c have lower priority ratings (e.g., are taking passengers to run routine errands, etc.). As shown in FIG. 2, SDVs 204a-204c are blocking lane 206 and lane 208 on roadway 200, such that the SDV 202 is unable to get around the SDVs 204a-204c. While SDVs 204a-204c could simply pull over to the side of the road, this increases the risk of an accident, hitting a pedestrian on the side of the road, etc. Thus, the present invention causes SDVs 204a-204c to adjust the spacing between them, thus affording SDV 202 with a clear pathway around them.

This process can be performed by SDV 202 directing the operations of the SDVs 204a-204c. However, in a preferred embodiment, such directions are issued by a coordinating server 201, which is a central server that 1) determines the size of each SDV that enters the roadway 200; 2) knows the final/current destination of at least SDV 202 (bowling alley, work, hospital); and 3) determines the priority rating for each of the SDVs. This information is preferably provided by computer systems that are either on-board the SDVs or are associated with (linked to) the SDVs.

For example, traffic sensors 253 (analogous to sensors 153 shown in FIG. 1) are able to determine the size of the SDVs, what type of SDVs they are (e.g., an ambulance), the state of the SDVs (e.g., does the ambulance have emergency lights on), etc. Furthermore, the coordinating server 201 receives positioning, speed, and other state information from the SDVs (both SDV 202 and SDVs 204a-204c). At this point, each SDV (202/204a-204c) as well as the coordinating server 201 will know the relative positioning and speed of the other surrounding SDVs. The coordinating server 201 will also have an indication as to the relative urgency of travel of each of the SDVs.

The coordinating server 201 and the SDVs 202/204a-204c themselves have knowledge at this point to help them decide which SDVs take priority, which SDVs need to speed up, and which SDVs need to slow down to make way.

Coordinating server 201 is able to wirelessly communication with SDVs 202/204a-204c using an SDV communication transceiver 223 (analogous to transceiver 123 shown in FIG. 1). Thus, the coordinating server 201 may request SDVs 204a-204c to slow down, speed up, etc. in order to make way for the urgent SDV 202.

The dimensions and speed of all vehicles are used to determine the exact spacing needed for lane switches. For example, consider FIG. 3, in which the SDVs 204a-204c have been repositioned in order to afford an unobstructed pathway 301 around the lower-priority SDVs 204a-204c. At high speed, movement of SDV 202 between lane 206 and lane 208 is essentially lateral. That is, the amount of direction change of SDV 202 at high speed is minimal, such that the length 303a of SDV 202 and the longitudinal spacing 303b between SDV 206a and SDV 206b (in different lanes as shown) needs to be such that longitudinal spacing 303b is as large or slightly larger than length 303a of SDV 202. That is, the longitudinal spacing 303b is not the lateral distance between SDV 204a and SDV 206b when measured between the sides of SDV 204a and SDV 206b, but rather is the one-dimensional distance from the front of SDV 204a and the rear of SDV 204b.

However, assume now that SDV 204a and SDV 204b are traveling at a very slow rate. In this scenario, the amount of spacing needed by SDV 202 to travel along unobstructed pathway 301 is closer to the width 305 of SDV 202. Thus, the coordinating server 201 will adjust the spacing between SDV 204a and SDV 204b according to their speed when SDV 202 will be passing between them while changing between lane 208 and lane 206.

Figure 3:
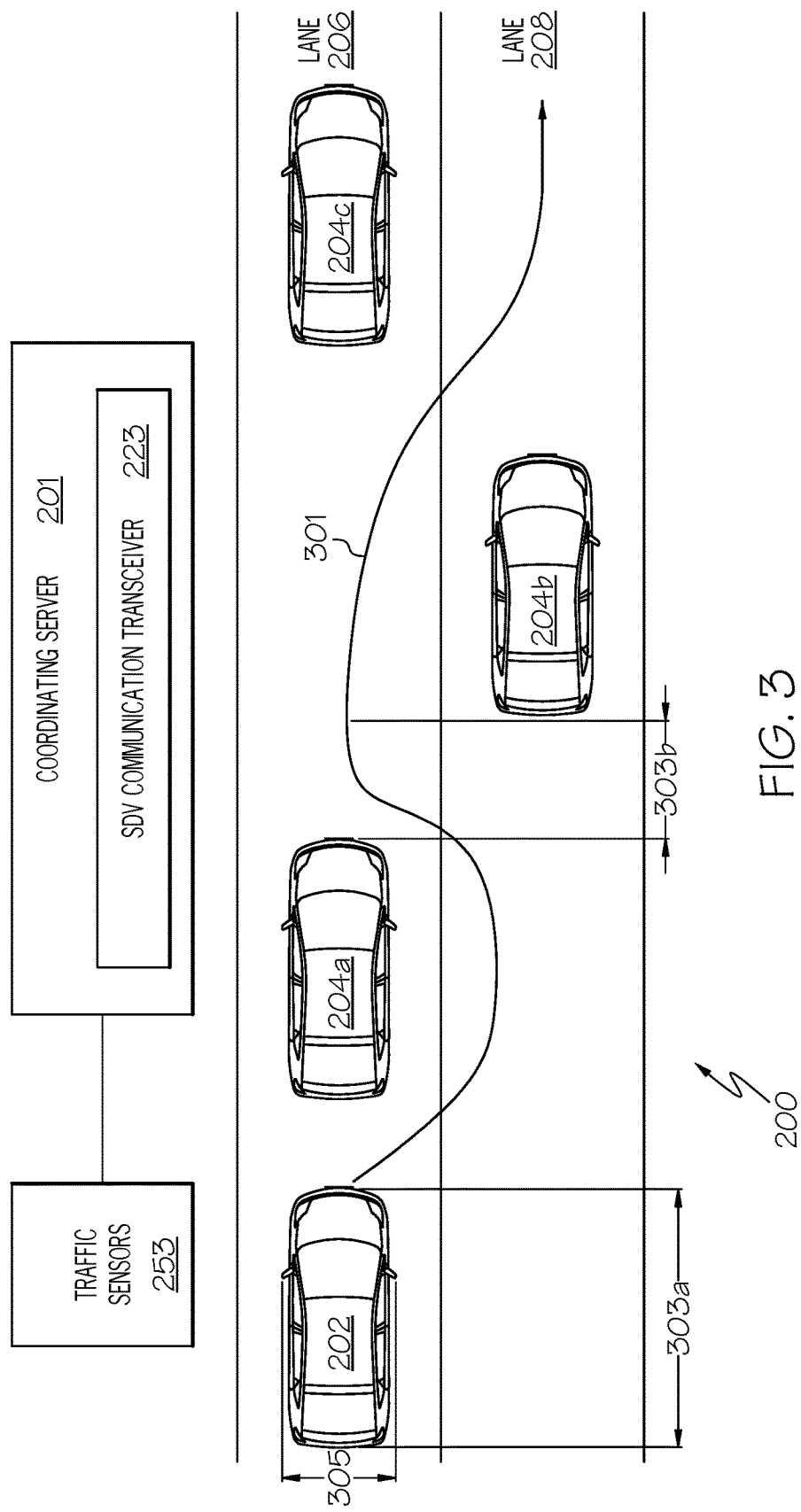
FIG. 3 depicts the roadway in FIG. 2 after other SDVs have been repositioned, thus providing an unimpeded pathway for a first SDV.
Figure 4:
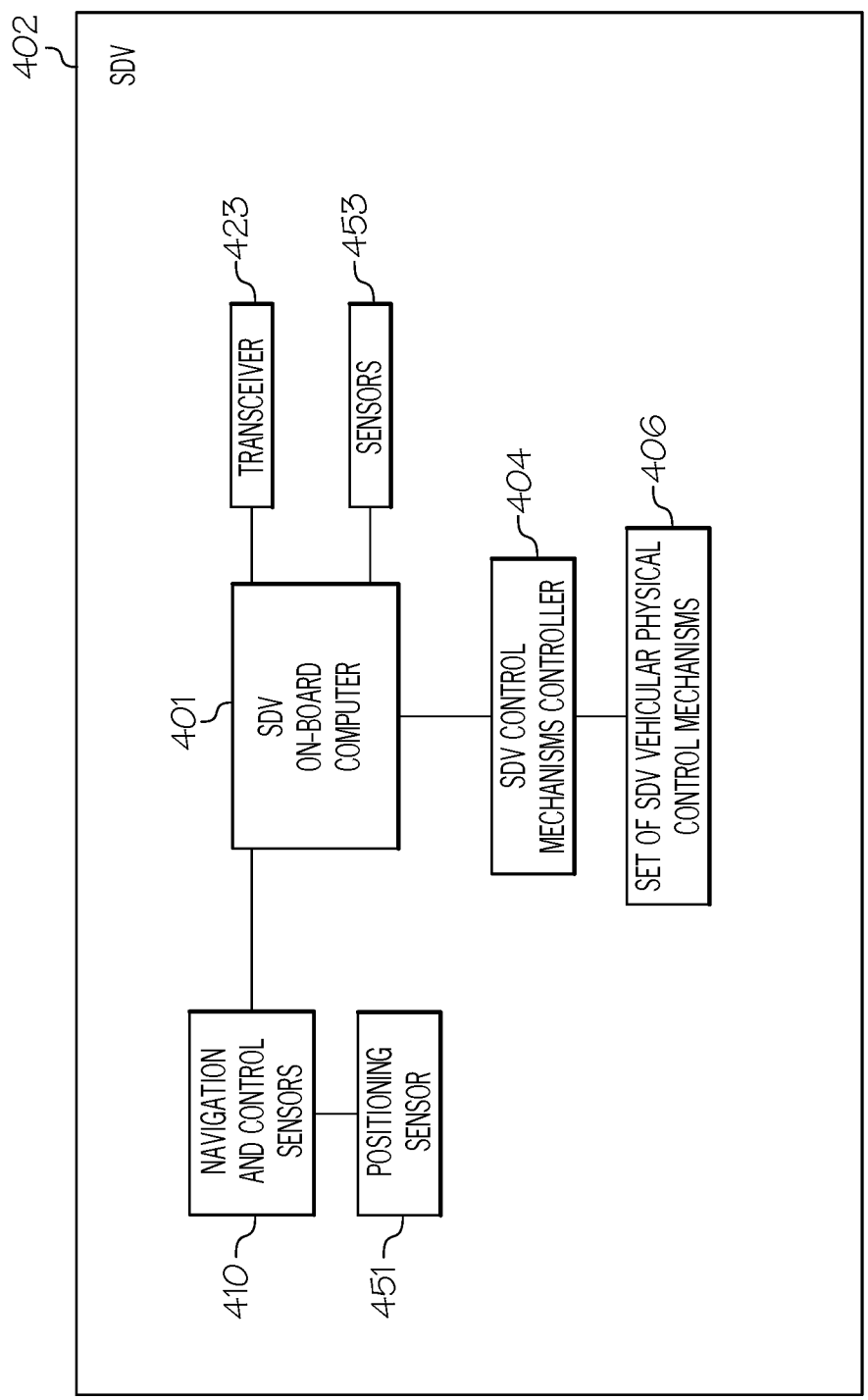
FIG. 4 depicts additional detail of control hardware within an SDV.

Additional detail of one or more embodiments of one or more of the SDV 202 and/or SDVs 204a-204c shown in FIGS. 2-3 is presented in FIG. 4 as SDV 402.

As shown in FIG. 4, SDV 402 has an SDV on-board computer 401 that controls operations of the SDV 402.

While in autonomous mode, SDV 402 operates without the input of a human driver, such that the SDV vehicular physical control mechanisms 406 (e.g., the engine throttle, steering mechanisms, braking systems, turn signals, etc.) are controlled by the SDV control mechanisms controller 404, which are under the control of the SDV on-board computer 401. That is, by processing inputs taken from navigation and control sensors 410 (which may use inputs from a positioning sensor 451, analogous to positioning sensor 151 shown in FIG. 1, to indicate the current position of the SDV 402), driver inputs are not needed to control the SDV 402.

As just mentioned, the SDV on-board computer 401 uses outputs from navigation and control sensors 410 to control the SDV 402. Navigation and control sensors 410 include hardware sensors that (1) determine the location of the SDV 402; (2) sense other cars and/or obstacles and/or physical structures around SDV 402; (3) measure the speed and direction of the SDV 402; and (4) provide any other inputs needed to safely control the movement of the SDV 402.

With respect to the feature of (1) determining the location of the SDV 402, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 402. Positioning system 151 may also use, either alone or in conjunction with a GPS system, physical movement sensors such as accelerometers (which measure rates of changes to a vehicle in any direction), speedometers (which measure the instantaneous speed of a vehicle), air-flow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of (2) sensing other cars and/or obstacles and/or physical structures around SDV 402, the positioning system 151 may use radar or other electromagnetic energy that is emitted from an electromagnetic radiation transmitter (e.g., transceiver 423 shown in FIG. 4), bounced off a physical structure (e.g., another car), and then received by an electromagnetic radiation receiver (e.g., transceiver 423). By measuring the time it takes to receive back the emitted electromagnetic radiation, and/or evaluating a Doppler shift (i.e., a change in frequency to the electromagnetic radiation that is caused by the relative movement of the SDV 402 to objects being interrogated by the electromagnetic radiation) in the received electromagnetic radiation from when it was transmitted, the presence and location of other physical objects can be ascertained by the SDV on-board computer 401.

With respect to the feature of (3) measuring the speed and direction of the SDV 402, this can be accomplished by taking readings from an on-board speedometer (not depicted) on the SDV 402 and/or detecting movements to the steering mechanism (also not depicted) on the SDV 402 and/or the positioning system 151 discussed above.

With respect to the feature of (4) providing any other inputs needed to safely control the movement of the SDV 402, such inputs include, but are not limited to, control signals to activate a horn, turning indicators, flashing emergency lights, etc. on the SDV 402.

In one embodiment of the present invention, the safe distance between two or more of the SDVs shown in FIG. 2 is based on the abilities of the SDVs. For example, SDV 202 and/or SDV 204b shown in FIG. 3 may have certain types of tires (e.g., rain tires), velocity ability (e.g., ability to travel in excess of 70 miles per hour), and braking abilities (e.g., four wheel disk brakes) that allow them to safely travel at 70 miles per hour within 10 feet of one another. However, if SDV 202 and/or SDV 204b do not meet these standards, then the minimum distance between them will be adjusted accordingly (e.g., to travel within 200 feet of one another at 70 miles per hour).

In one embodiment of the present invention, determining the type and/or condition of tires on SDVs is performed by image analysis. For example, assume that the sensors 453 shown in FIG. 4 on SDV 402 are on-board cameras aimed at the tires on SDV 402. The nature of the tread, inflation, etc. of the tires is determined by image analysis of images of the tires captured by these cameras, thereby determining one of the factors that determine the condition of the SDV 402.

In one embodiment of the present invention, adjusting the spatial separation between an SDV and another vehicle is based on other dangerous conditions of the SDV and/or the other vehicle. For example, assume that SDV 202 is traveling closely to SDV 204b, as indicted by unobstructed pathway 301 shown in FIG. 3. Assume further that there is a visible danger that is posed to SDV 202 by SDV 204b. This visible danger may be visually observed by occupants of SDV 202 and/or by sensors (e.g., sensors 453 shown in FIG. 4) on the SDV 202/204b.

For example, assume that SDV 204b has a loose load (e.g., a mattress) tied to its top, which is showing indications of flying off at any moment (e.g., the straps holding the mattress are loose, etc.). Similarly, SDV 204b may have a wobbling tire that appears to be degrading the stability of SDV 204b, or SDV 204b may be swerving back and forth within lane 208. Similarly, SDV 204b may be a tow truck that is towing another vehicle (not shown), which is showing signs of potentially becoming unattached to the tow truck (SDV 204b).

As a result of such visible dangers, two results may occur.

First, coordinating server 201 may direct SDV 204b to slow down or even pull off to the side of roadway 200.

Second, coordinating server 201 may increase the longitudinal spacing 303b shown in FIG. 3, thus affording SDV 202 additional room to maneuver.

Figure 5:
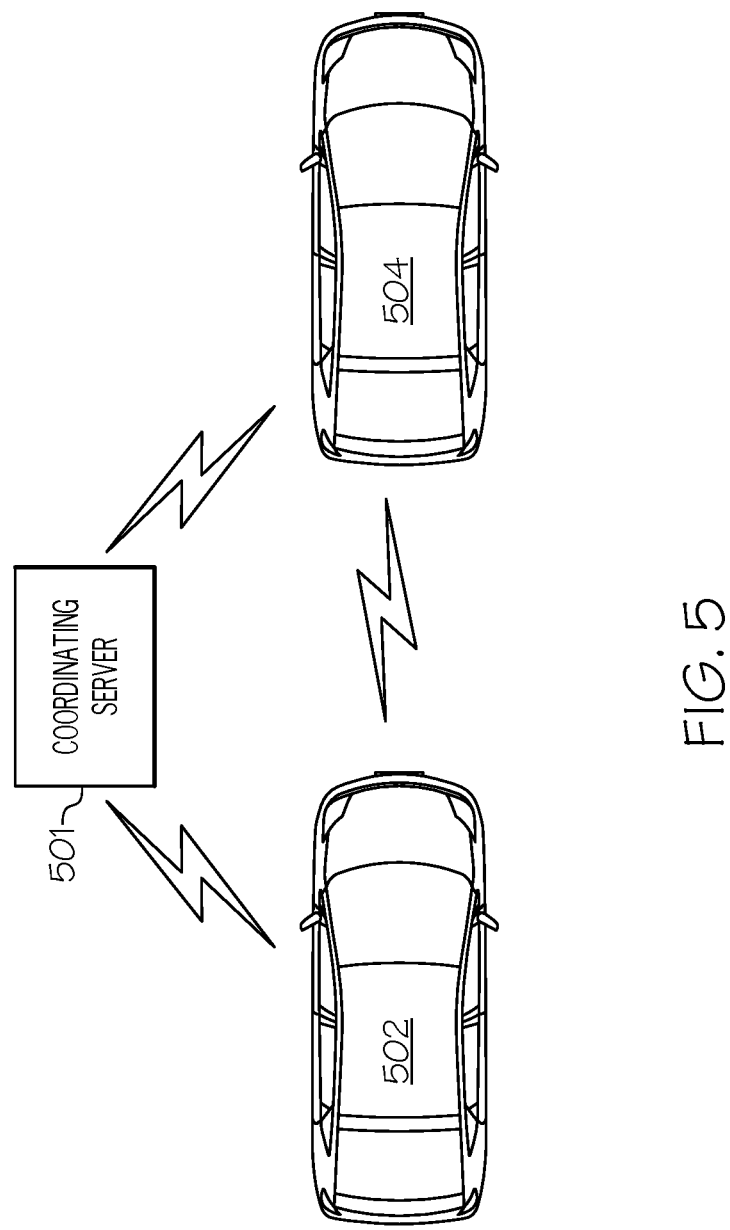
FIG. 5 illustrates exemplary communication linkages among multiple vehicles capable of operating in an autonomous mode and a coordinating server.

With reference now to FIG. 5, communication linkages between the coordinating server 501 (analogous to coordinating server 201 shown in FIG. 2) and/or an SDV 502 (analogous to SDV 202 shown in FIG. 2) and/or an SDV 504 (analogous to one or more of the SDVs 204a-204b shown in FIG. 2) are presented. That is, in one or more embodiments of the present invention, coordinating server 501 is able to communicate with SDV 502 and/or vehicle SDV 504, and SDV 502 is able to directly communicate with SDV 504, thus allowing SDV 502 to directly control the movement of SDV 504 (and vice versa) when required.

Figure 6:
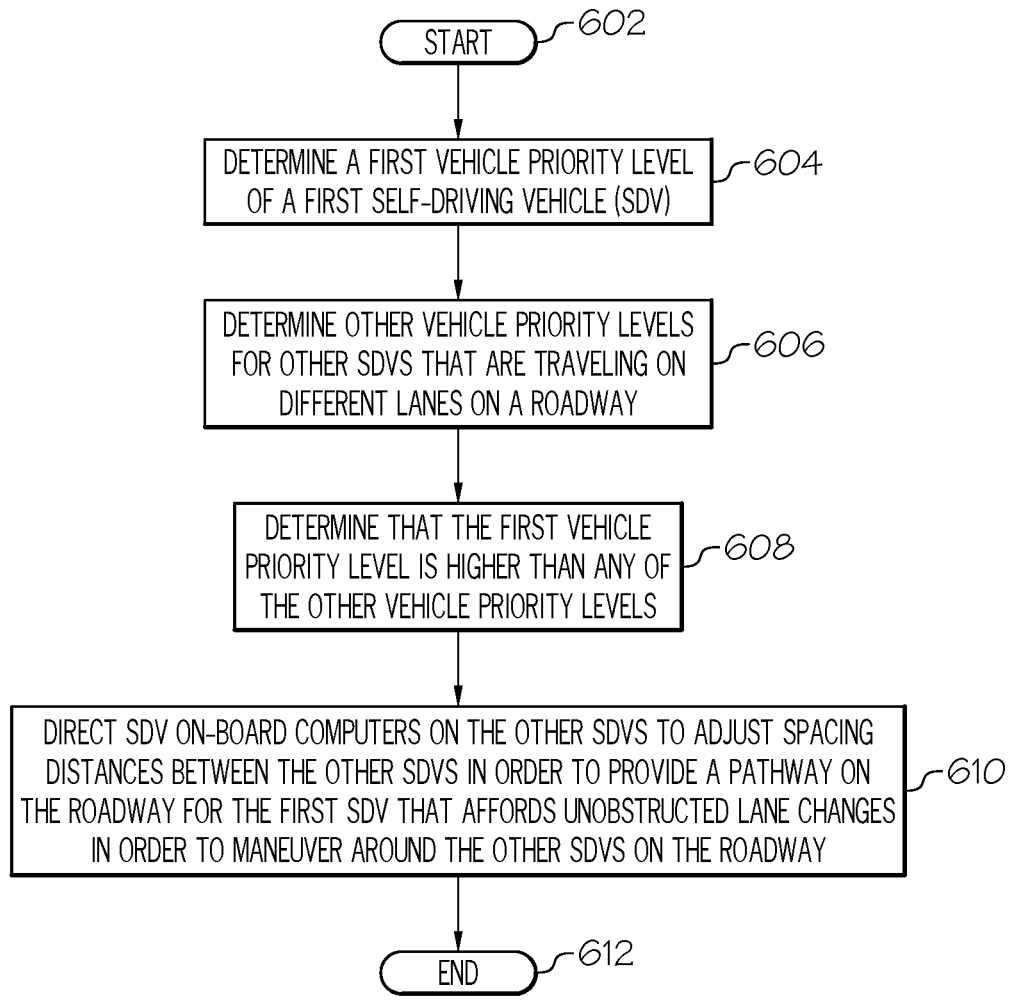
FIG. 6 is a high-level flow chart of one or more steps performed by one or more processors and/or other hardware to provide a pathway on a roadway for a first SDV that includes unobstructed lane changes in order to maneuver around other SDVs on the roadway.

With reference now to FIG. 6, a high-level flow chart of one or more steps performed by one or more processors and/or other hardware to provide a pathway on a roadway for a first SDV that includes unobstructed lane changes in order to maneuver around other SDVs on the roadway is presented.

After initiator block 602, one or more processors (e.g., within coordinating server 201 shown in FIG. 2 or by an SDV on-board computer 401 in one or more of the SDV 202 and/or SDVs 204a-204c shown in FIGS. 2-3) determine a first vehicle priority level of a first self-driving vehicle (SDV) (e.g., SDV 202 shown in FIG. 2), as described in block 604. A vehicle priority level describes a priority of movement relative to another vehicle. Thus, in the example shown in FIG. 2, SDV 202 has a higher priority than SDVs 204a-204c, such that SDVs 204a-204c will need to accommodate SDV 202. For example, SDV 202 may be on an emergency run to a hospital (even if SDV 202 is a personal vehicle, but has a passenger in need of emergency medical attention). If SDVs 204a-204c are on routine routes (e.g., going to the store, the movies, etc.), then their priority levels are lower than that of SDV 202. The processor(s) are able to determine the relative priority ratings for each of the SDVs.

Thus, as described in block 606, the processors(s) are able to determine not only the priority rating of SDV 202, but also the other vehicle priority levels for other self-driving vehicles (SDVs) (e.g., SDVs 204a-204c) that are traveling on different lanes on a roadway (e.g., roadway 200 shown in FIG. 2).

As described in block 608, the processor(s) determine that the first vehicle priority level (e.g., for SDV 202) is higher than any of the other vehicle priority levels (e.g., for SDVs 204a-204c). Thus, SDV 202 is determined to have a higher priority over any other SDV in lane 206 and/or land 208 shown in FIG. 2. In response to determining that the first vehicle priority level is higher than any of the other vehicle priority levels, the processor(s) direct SDV on-board computers (e.g., SDV on-board computer 401 shown in FIG. 4) on the other SDVs (204a-204c) to adjust spacing distances between the other SDVs, as described in block 610. Thus, as shown in FIG. 3, these adjusted spacing distances between the other SDVs provide a pathway (e.g., the unobstructed pathway 301 shown in FIG. 3) on the roadway for the first SDV that includes unobstructed lane changes (e.g., between lane 208 and lane 206), thus permitting the first SDV to maneuver around the other SDVs on the roadway in an unimpeded manner.

The flow chart ends at terminator block 612.

In an embodiment of the present invention, the processor(s) direct the SDV on-board computers on the other SDVs to adjust spacing distances between the other SDVs by altering velocities of the other SDVs without changing lanes. For example, coordinating server 201 may direct SDV 204a to slow down and SDV 206b to speed up, thus increasing the size of longitudinal spacing 303b.

In an embodiment of the present invention, the processor(s) determine the first vehicle priority level (e.g., for SDV 202) according to a predefined permanent role of the first SDV. That is, if SDV 202 is an ambulance, then it is assumed to have a higher priority level than a food delivery van. This provides the advantage of quickly determining the priority level for a particular SDV.

In an embodiment of the present invention, the processor(s) determine a current planned destination of the first SDV, and then determine the first vehicle priority level according to a purpose of traveling to the current planned destination by the first SDV. For example, if SDV 202 is traveling to a doctor's office, and SDVs 204a-204c are also all traveling to a doctor's office, then they are determined to have equal priority. However, if SDVs 204a-204c are going to a shopping mall, then the priority level of SDV 202 is higher than that of SDVs 204a-204c. These destinations can be derived by interrogating an on-board navigation system (e.g., part of SDV on-board computer 401 shown in FIG. 4) of each of the SDVs 202/204a-204c. This provides the advantage of quickly determining the priority level for a particular SDV.

In an embodiment of the present invention, not only may a destination be determined, but a purpose for going to that destination may be derived.

For example, the processors(s) may examine an electronic calendar (within the SDV, or on a cloud-based server) that shows an entry and purpose of an appointment at a certain location (e.g., a doctor's office), thus allowing the processor(s) to determine the purpose of traveling to the current planned destination by the first SDV. Based on this determination, the processor(s) are able to further determine the first vehicle priority level according to the purpose of traveling to the current planned destination by the first SDV. For example, if the calendar entry states that the passenger in SDV 202 is going to a hospital for surgery, then that is given a higher priority (e.g., by examining a lookup table of medical procedures and their importance) than if the electronic calendar indicated that the passenger was merely going in for routine vaccinations (e.g., receiving a flu vaccine). This provides the advantage of quickly determining the priority level for a particular SDV.

In another example and embodiment of the present invention, assume that the processor(s) have determined that the current planned destination is a location of a health care facility. Assume further that the processor(s) have determined (by examination of entries in the electronic calendar) that the electronic calendar has no entry for an appointment on a current date for the passenger at the health care facility. As such, the system/processors may conclude that the visit to the health care facility was not planned or routine, and therefore is likely to be an emergency visit by the passenger of SDV 202 to the health care facility. As such, the processor(s) may further determine the first vehicle priority level for the first vehicle to be high (e.g., the priority level for SDV 202 is higher than the priority levels for SDVs 204a-204c). This provides the advantage of quickly determining the priority level for a particular SDV.

In an embodiment of the present invention, sensor readings are received by the processor(s) from a physical sensor along the roadway (e.g., traffic sensors 253 in FIG. 2, which may be configured to not only monitor vehicles, but also weather conditions on roadway 200). Based on the weather conditions on the roadway, the processor(s) further adjust the spacing distances between the other SDVs (e.g., between SDV 204a and SDV 204b, and or between SDV 202 and SDV 204a) based on the weather conditions on the roadway. That is, if roadway conditions are wet/snowy, then longitudinal spacing 303b is expanded, thus providing the advantage of providing a unobstructed pathway 301 to SDV 202.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
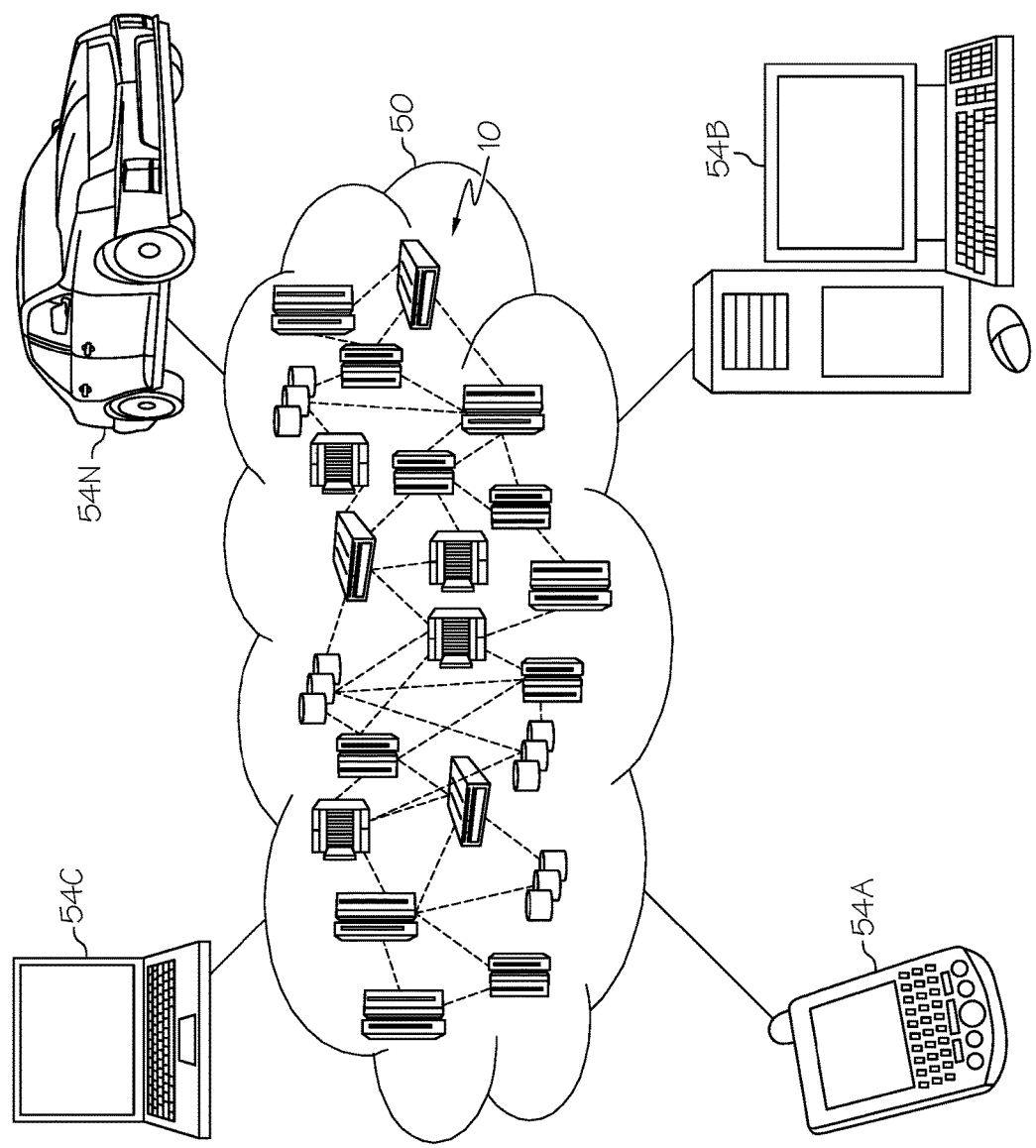
FIG. 7 depicts a cloud computing node according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
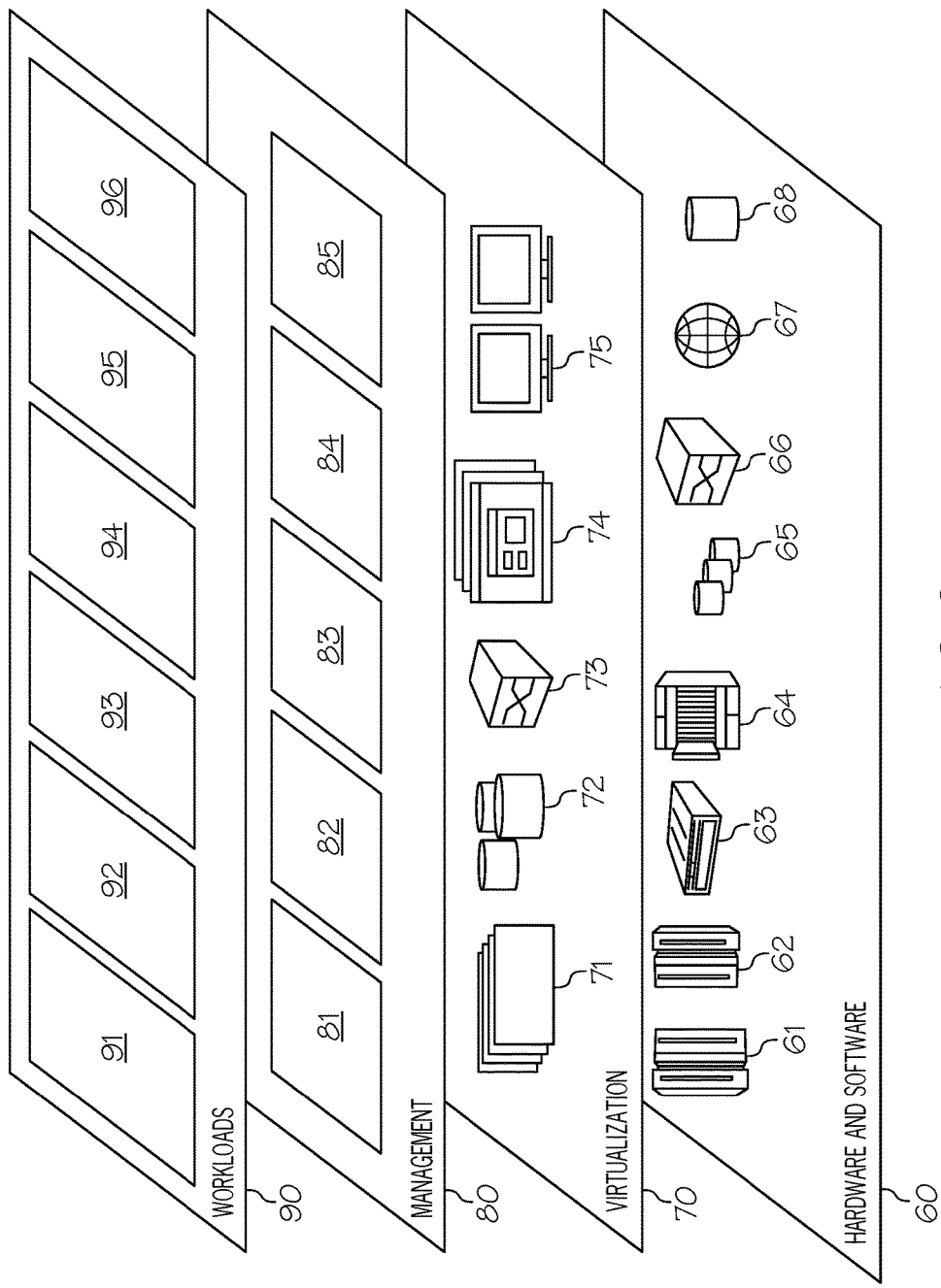
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    determining, by one or more processors, a first vehicle priority level of a first self-driving vehicle (SDV), wherein a vehicle priority level describes a priority of movement relative to another vehicle, wherein the first vehicle priority level is determined by:
        determining, by one or more processors, a current planned destination of the first SDV;
        determining, by one or more processors, a purpose of traveling to the current planned destination by the first SDV by examining an electronic calendar of a passenger of the first SDV; and
        determining, by one or more processors, the first vehicle priority level according to the purpose of traveling to the current planned destination by the first SDV;
    determining, by one or more processors, other vehicle priority levels for other self-driving vehicles (SDVs) that are traveling on different lanes on a roadway;
    determining, by one or more processors, that the first vehicle priority level is higher than any of the other vehicle priority levels; and
    in response to determining that the first vehicle priority level is higher than any of the other vehicle priority levels, directing, by one or more processors, SDV on-board computers on the other SDVs to adjust spacing distances between the other SDVs, wherein adjusted spacing distances between the other SDVs provide a pathway on the roadway for the first SDV that comprises unobstructed lane changes, thus permitting the first SDV to maneuver around the other SDVs on the roadway in an unimpeded manner.

2. The method of claim 1, further comprising:
    directing, by one or more processors, the SDV on-board computers on the other SDVs to adjust spacing distances between the other SDVs by altering velocities of the other SDVs without changing lanes.

3. The method of claim 1, further comprising:
    further determining, by one or more processors, the first vehicle priority level according to a predefined permanent role of the first SDV.

4. The method of claim 1, further comprising:
    determining, by one or more processors, that the current planned destination is a location of a health care facility;
    determining, by one or more processors, that the electronic calendar has no entry for an appointment on a current date for the passenger at the health care facility;
    in response to determining that the electronic calendar has no entry for the appointment on the current date for the passenger at the health care facility, determining, by one or more processors, that the passenger is making an emergency visit to the health care facility; and
    in response to determining that the passenger is making the emergency visit to the health care facility, further determining, by one or more processors, the first vehicle priority level for the first SDV.

5. The method of claim 1, further comprising:
    receiving, by one or more processors, sensor readings from a physical sensor along the roadway, wherein the sensor readings indicate weather conditions on the roadway; and
    further adjusting, by one or more processors, the spacing distances between the other SDVs based on the weather conditions on the roadway.

6. A computer program product for providing a pathway on a roadway for a first self-driving vehicle (SDV) that comprises unobstructed lane changes in order to maneuver around other SDVs on the roadway, the computer program product comprising a computer readable storage medium having program instructions embodied therewith, wherein the computer readable storage medium is not a transitory signal per se, the program instructions readable and executable by a processor to cause the processor to perform a method comprising:
    determining a first vehicle priority level of a first self-driving vehicle (SDV), wherein a vehicle priority level describes a priority of movement relative to another vehicle, wherein the first vehicle priority level is determined by:
        determining a current planned destination of the first SDV;
        determining a purpose of traveling to the current planned destination by the first SDV by examining an electronic calendar of a passenger of the first SDV; and
        determining the first vehicle priority level according to the purpose of traveling to the current planned destination by the first SDV;
    determining other vehicle priority levels for other self-driving vehicles (SDVs) that are traveling on different lanes on a roadway;
    determining that the first vehicle priority level is higher than any of the other vehicle priority levels; and
    in response to determining that the first vehicle priority level is higher than any of the other vehicle priority levels, directing SDV on-board computers on the other SDVs to adjust spacing distances between the other SDVs, wherein adjusted spacing distances between the other SDVs provide a pathway on the roadway for the first SDV that comprises unobstructed lane changes, thus permitting the first SDV to maneuver around the other SDVs on the roadway in an unimpeded manner.

7. The computer program product of claim 6, wherein the method further comprises:
    directing the SDV on-board computers on the other SDVs to adjust spacing distances between the other SDVs by altering velocities of the other SDVs without changing lanes.

8. The computer program product of claim 6, wherein the method further comprises:
    further determining the first vehicle priority level according to a predefined permanent role of the first SDV.

9. The computer program product of claim 6, wherein the method further comprises:
    determining that the current planned destination is a location of a health care facility;
    determining that the electronic calendar has no entry for an appointment on a current date for the passenger at the health care facility;
    in response to determining that the electronic calendar has no entry for the appointment on the current date for the passenger at the health care facility, determining that the passenger is making an emergency visit to the health care facility; and in response to determining that the passenger is making the emergency visit to the health care facility, further determining the first vehicle priority level for the first SDV.

10. The computer program product of claim 6, wherein the method further comprises:

receiving sensor readings from a physical sensor along the roadway, wherein the sensor readings indicate weather conditions on the roadway; and further adjusting the spacing distances between the other SDVs based on the weather conditions on the roadway.

11. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to determine a first vehicle priority level of a first self-driving vehicle (SDV), wherein a vehicle priority level describes a priority of movement relative to another vehicle, wherein the first vehicle priority level is determined by:

determining a current planned destination of the first SDV;

determining a purpose of traveling to the current planned destination by the first SDV by examining an electronic calendar of a passenger of the first SDV; and determining, by one or more processors, the first vehicle priority level according to the purpose of traveling to the current planned destination by the first SDV;

program instructions to determine other vehicle priority levels for other self-driving vehicles (SDVs) that are traveling on different lanes on a roadway;

program instructions to determine that the first vehicle priority level is higher than any of the other vehicle priority levels; and program instructions to, in response to determining that the first vehicle priority level is higher than any of the other vehicle priority levels, direct SDV on-board computers on the other SDVs to adjust spacing distances between the other SDVs, wherein adjusted spacing distances between the other SDVs provide a pathway on the roadway for the first SDV that comprises unobstructed lane changes, thus permitting the first SDV to maneuver around the other SDVs on the roadway in an unimpeded manner.

12. The computer system of claim 11, further comprising:
program instructions to direct the SDV on-board computers on the other SDVs to adjust spacing distances between the other SDVs by altering velocities of the other SDVs without changing lanes.

13. The computer system of claim 11, further comprising:
program instructions to further determine the first vehicle priority level according to a predefined permanent role of the first SDV.

14. The computer system of claim 11, further comprising:
program instructions to determining that the current planned destination is a location of a health care facility;

program instructions to determine that the electronic calendar has no entry for an appointment on a current date for the passenger at the health care facility;

program instructions to, in response to determining that the electronic calendar has no entry for the appointment on the current date for the passenger at the health care facility, determine that the passenger is making an emergency visit to the health care facility; and program instructions to in response to determining that the passenger is making the emergency visit to the health care facility, further determine the first vehicle priority level for the first SDV.

* * * * *